United States Patent [19]

Albright et al.

[11] 4,191,883

[45] Mar. 4, 1980

[54] METHOD FOR DETERMINING RESIDUAL OIL CONCENTRATION OF A FORMATION USING THERMAL NEUTRON DECAY MEASUREMENTS

[75] Inventors: James C. Albright; Preston L. Gant, both of Ponca City, Okla.

[73] Assignee: Conoco, Inc., Ponca City, Okla.

[21] Appl. No.: 911,626

[22] Filed: Jun. 1, 1978

[51] Int. Cl.² ............................................. G01V 5/00
[52] U.S. Cl. ..................................... 250/259; 250/269
[58] Field of Search ............... 250/259, 261, 262, 256, 250/269, 270, 301, 260

[56] References Cited

U.S. PATENT DOCUMENTS

| 3,562,523 | 2/1971 | Richardson, et al. | 250/259 |
| 3,631,245 | 12/1971 | Jorden et al. | 250/259 |
| 3,748,474 | 7/1973 | Murphy | 250/259 |
| 3,783,683 | 1/1974 | Murphy et al. | 250/260 |

*Primary Examiner*—Davis L. Willis
*Attorney, Agent, or Firm*—Bayless E. Rutherford, Jr.

[57] ABSTRACT

An improvement in the method of determining oil saturation in a subterranean formation, penetrated by a well-bore, is disclosed. In the method of determining oil concentration by measuring thermal neutron decay with a low salinity aqueous liquid in said well-bore and said formation, and measuring thermal neutron decay with a high salinity aqueous liquid in said well-bore and said formation, the improvement comprises adding to said low salinity liquid in the well-bore, only, a material which adjusts the thermal neutron capture cross section of the well-bore so that it is approximately the same as the thermal neutron capture cross section of the well-bore when it contains the high salinity liquid.

13 Claims, No Drawings

METHOD FOR DETERMINING RESIDUAL OIL CONCENTRATION OF A FORMATION USING THERMAL NEUTRON DECAY MEASUREMENTS

FIELD OF THE INVENTION

The invention is in the general field of determining oil saturation in a subterranean formation, penetrated by a bore-hole, by the use of thermal neutron decay measurement. More specifically, the invention is in the field of log-inject-log technique for determining residual oil saturation.

GENERAL BACKGROUND

The importance of determining residual oil in place by means of subsurface logging techniques has been recognized for some time. Several techniques have been used in the past for this purpose. More recently, one of the more popular techniques measures the rate of thermal neutron decay following a burst of neutrons from a downhole generator. The rate of neutron decay is dependent upon the capture cross section of the formation rock, the capture cross section of the fluids contained within the formation rock, and the volumetric fractions of the rock and fluids. The measurements reflect only the total capture cross section of the composite material which is dependent upon many variables. If the contrast in the capture cross section between the oil and the formation waters is sufficient and the porosity of the formation is known, then qualitative evaluations of the water saturation can be performed.

This method is described in U.S. Pat. No. 3,562,523, issued Feb. 9, 1971, which patent is made a part of this disclosure.

A typical technique for determining residual oil using thermal neutron decay is known as log-inject-log. The principle of this technique is to inject water of a given salinity, either very high or very low, run a log, inject water at the other extreme salinity, and relog with the same tool. (By "logging" is meant measuring thermal neutron decay.) The only changes which should have taken place are in the salinity of the water in the borehole and in the formation surrounding the borehole. If the borehole effect is negligible, it is then possible to calculate the amount of water and oil in the formation. Present interpretation methods assume no borehole effect. However, there is some question as to the validity of this assumption. Our invention provides a means of eliminating, or substantially reducing, this borehole effect in the log-inject-log technique of measuring residual oil.

Briefly, our invention overcomes this borehole effect by adding to the low salinity water certain solid particles, as described hereinafter, which adjust the thermal neutron capture cross section of the well-bore so that it is approximately the same as the thermal neutron capture cross section of the well-bore when it contains the high salinity liquid.

BRIEF SUMMARY OF THE INVENTION

In the method of determining oil saturation in a subterranean formation, penetrated by a well-bore, wherein the method comprises:

(a) measuring the thermal neutron decay of a liquid, said liquid having either low or high salinity, in said well-bore and said formation to obtain a first value $\Sigma_A$, (b) measuring the thermal neutron decay of a liquid, said liquid having a salinity value opposite of that used in step (a) in said well-bore and said formation to obtain a second value $\Sigma_B$, (c) determining from $\Sigma_A$ and $\Sigma_B$ the oil saturation in said reservoir, the improvement comprising adding to said low salinity liquid a sufficient amount of a material which adjusts the thermal neutron capture cross section of that part of said low salinity material which remains in the borehole so that it is approximately the same as the thermal neutron capture cross section of the high salinity liquid.

DETAILED DESCRIPTION

As stated hereinbefore the determination of residual oil by measurement of thermal neutron decay is well-known in the art. For example, it is described in U.S. Pat. No. 3,562,523.

Additionally, the log-inject-log technique of using thermal neutron decay to determine residual oil is well-known in the art. This technique has been described briefly in the general background section. Additional information concerning this technique is provided in the following U.S. Pat. Nos.: 3,783,683; 3,748,474; and 3,631,245. These patents are made a part of this disclosure.

The important feature of our invention is the addition to that part of the low salinity liquid which is in the borehole a material which adjusts the thermal neutron capture cross section of the borehole so that it is approximately the same as when the high salinity liquid is in the borehole.

Our invention can be illustrated also by the following equations:

$$\Sigma_L = \Sigma_{WL}\phi S_w + \Sigma_{HC}\phi(1-S_w) + \Sigma_r(1-\phi) + WB_L$$

$$\Sigma_H = \Sigma_{WH}\phi S_w + \Sigma_{HC}\phi(1-S_w) + \Sigma_r(1-\phi) + WB_H$$

$$\Sigma_H - \Sigma_L = \phi S_w(\Sigma_{WH} - \Sigma_{WL}) + (WB_H - WB_L)$$

According to our invention $WB_L$ is adjusted to be the same as $WB_H$ $$\therefore S_w = \frac{\Sigma_H - \Sigma_L}{\phi(\Sigma_{WH} - \Sigma_{WL})}$$

$S_{HC} = 1 - S_w$

In the foregoing
  $\Sigma$ = capture cross section
  $\Sigma_{WL}$ = cross section of low salinity water
  $\Sigma_{WH}$ = cross section of high salinity water
  $\Sigma_r$ = cross section of rock matrix
  $\Sigma_L$ = log reading with low salinity water
  $\Sigma_H$ = log reading with high salinity water
  $S_w$ = water saturation (fraction of pore space)
  $S_{HC}$ = hydrocarbon (oil) saturation (fraction of pore space)
  $\phi$ = porosity
  $WB_L$ = well-bore effect with low salinity water
  $WB_H$ = well-bore effect with high salinity water The materials which are added to the low salinity liquid should have a high thermal neutron capture ability. Examples of such materials include boron, cadmium, gadolinium, dysprosium, samarium, europium, chlorine and suitable compounds containing these elements. The materials should preferably be insoluble in water and have a particle size sufficiently large in order not to enter the pores of the formation. The density of the materials should be similar to that of water. The specified elements or compounds containing the elements can be present in the form of plastic beads, ceramic beads or can be on ion exchange resins.

The high-thermal-neutron capturing material is added only to the amount of low salinity liquid in the well-bore. Both the amount of low salinity liquid and the amount of high-thermal-neutron capturing material can be readily calculated by anyone skilled in the art. The amount of high-thermal-neutron-capturing material should be that amount which will increase capture effect to that of the high salinity liquid. The thermal neutron capture cross section of the high salinity liquid can be represented by $\Sigma_{HL}$. The thermal neutron capture cross section of the added material can be represented by $\Sigma_M$. The volume fraction of the added material can be represented by X. X can then be determined using the formula equation $$X = \frac{\Sigma_{WH} - \Sigma_{WL}}{\Sigma_M - \Sigma_{WL}}$$

Either the high salinity liquid or the low salinity liquid containing the $\Sigma_M$ material can be added first. When the low salinity liquid containing the $\Sigma_M$ material is used in the first step of the method it is necessary to remove the particles of $\Sigma_M$ material prior to conducting the step using the high salinity material. Knowing this is required any person skilled in the art can readily accomplish this.

The term low salinity liquid and high salinity liquid are generally understood by those skilled in this art. However, in order to provide a more complete teaching we will provide a definition of these terms. The term low salinity refers to aqueous liquids containing not more then 50,000 parts per million sodium chloride, or the salinity equivalent thereof. The term high salinity refers to aqueous liquids containing at least 100,000 parts per million sodium chloride, or the salinity equivalent thereof.

In order to illustrate the nature of the present invention still more clearly the following examples will be given. It is to be understood, however, that the invention is not to be limited to the specific conditions or details set forth in these examples except insofar as such limitations are specified in the appended claims.

EXAMPLE

The high salinity liquid is a sodium chloride brine of 250,000 ppm concentration. Its capture cross section is 120 capture units ($10^{-3} cm^{-1}$). The low salinity liquid is fresh water, its capture cross section is 22 capture units. Borated polyethylene beads are added to the low salinity liquid. The beads contain 5% boron by weight. Their capture cross section is 2610 capture units. The beads are added so as to comprise 3.8% of the volume of the fresh water-bead slurry. Then the capture cross section of the slurry is $$\Sigma_S = (1 - 0.038)\Sigma_W + 0.038\Sigma_b$$

where $\Sigma_S$ = cross section of slurry
$\Sigma_W$ = cross section of water = 22 capture units
$\Sigma_b$ = cross section of beads = 2610 capture units
then $$\Sigma_S = (1 - 0.038) \times 22 + 0.38 \times 2610 = 120 \text{ capture units}$$

The high salinity liquid is injected into the borehole and surrounding formation. A thermal neutron log reading is then taken. After removing the high salinity liquid, the low salinity liquid containing borated polyethylene beads is injected into the borehole. A thermal neutron log reading is then taken. From these log readings and the porosity (which has been determined) the amount of oil in the formation is calculated by the equation shown in the foregoing.

Thus, having described the invention in detail, it will be understood by those skilled in the art that certain variations and modifications may be made without departing from the spirit and scope of the invention as defined herein and in the appended claims.

We claim:

1. In the method of determining oil saturation in a subterranean formation penetrated by a well-bore wherein the method comprises:
   (a) measuring the thermal neutron decay of a liquid, said liquid having either low or high salinity, in said well-bore and said formation to obtain a first value $\Sigma_A$
   (b) measuring the thermal neutron decay of a liquid, said liquid having a salinity value opposite of that used in step (a) in said well-bore and said formation to obtain a second value $\Sigma_B$ and
   (c) determining from $\Sigma_A$ and $\Sigma_B$ the oil saturation in said reservoir, the improvement comprising adding to said low salinity liquid a sufficient amount of a material which adjusts the thermal neutron capture cross section of that part of said low salinity material which remains in the borehole so that the thermal neutron capture cross section is approximately the same as the thermal neutron capture cross section of the high salinity liquid.

2. The method of claim 1 wherein the thermal neutron additive material is selected from the group consisting of boron, cadmium, gadolinium, dysprosium, samarium, europium, chlorine and compounds containing these elements.

3. The method of claim 2 wherein the amount of material which is added is determined by using the equation $$X = \frac{\Sigma_{WH} - \Sigma_{WL}}{\Sigma_M - \Sigma_{WL}}$$

wherein X is the volume fraction of the material, $\Sigma_{WH}$ is the thermal neutron capture cross section of the high salinity liquid, $\Sigma_{WL}$ is the thermal neutron capture cross section of the low salinity liquid in the well-bore, and $\Sigma_M$ is the thermal neutron cross section of the additive material.

4. The method of claim 3 wherein the term high salinity liquid refers to a liquid containing at least 100,000 parts per million sodium chloride.

5. The method of claim 4 wherein the term low salinity liquid refers to material containing not more than 50,000 parts per million sodium chloride.

6. The method of claim 5 wherein the material which is added is boron.

7. The method of claim 6 wherein the boron is added in the form of borated polyethylene beads.

8. The method of claim 5 wherein the material is cadmium or a cadmium-containing compound.

9. The method of claim 5 wherein the material is gadolinium or a gadolinium-containing compound.

10. The method of claim 5 wherein the material is dysprosium or a dysprosium-containing compound.

11. The method of claim 5 wherein the material is samarium or a samarium-containing compound.

12. The method of claim 5 wherein the material is europium or an europium-containing compound.

13. The method of claim 5 wherein the material is chlorine or a chlorine-containing compound.

* * * * *